United States Patent
Midden et al.

(10) Patent No.: US 7,152,765 B1
(45) Date of Patent: Dec. 26, 2006

(54) DISPENSER VALVE ASSEMBLY

(75) Inventors: William E. Midden, Springfield, IL (US); Jeffery W. Kadyk, Pleasant Plains, IL (US); William H. Thomas, Pawnee, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 116 days.

(21) Appl. No.: 10/651,274

(22) Filed: Aug. 28, 2003

Related U.S. Application Data (60) Provisional application No. 60/406,422, filed on Aug. 28, 2002.

(51) Int. Cl.
*B65D 5/62* (2006.01)

(52) U.S. Cl. ............... 222/511; 222/146.6; 222/559

(58) Field of Classification Search ............ 222/146.6, 222/531, 532, 537, 511, 559, 561
See application file for complete search history.

(56) References Cited

U.S. PATENT DOCUMENTS

| | | | |
|---|---|---|---|
| 3,731,855 A * | 5/1973 | Vos | ............................ 222/561 |
| 4,271,986 A | 6/1981 | Stecker | |
| 4,381,099 A | 4/1983 | Knedlik | |
| 4,452,381 A | 6/1984 | Freeman | |
| 4,832,231 A * | 5/1989 | Kolody | .................... 222/144.5 |
| 4,860,931 A | 8/1989 | Hubbard | |
| 4,878,760 A | 11/1989 | Newton | |
| 4,911,333 A | 3/1990 | Wilson | |
| 5,463,877 A * | 11/1995 | Young et al. | ............ 222/146.6 |
| 5,487,493 A | 1/1996 | McNabb | |
| 5,678,737 A | 10/1997 | White | |
| 5,813,574 A | 9/1998 | McNabb | |
| 6,058,721 A | 5/2000 | Midden | |
| 6,076,371 A | 6/2000 | McNabb | |
| 6,189,745 B1 | 2/2001 | Frank | |
| 6,286,724 B1 | 9/2001 | Midden | |
| 6,349,852 B1 | 2/2002 | Ford | |
| 6,619,056 B1 | 9/2003 | Midden | |

* cited by examiner

*Primary Examiner*—Eric Keasel
(74) *Attorney, Agent, or Firm*—Barnes & Thornburg LLP (57) ABSTRACT

An apparatus and method of dispensing a partially frozen beverage. The apparatus includes at least one beverage hopper for retaining a quantity of partially frozen beverage. The beverage hopper has a dispensing aperture formed therein and a guide member in an exterior surface of the beverage hopper. A chilling unit cools the partially frozen beverage retained within the beverage hopper. A dispenser assembly is provided which includes a handle, a biasing element, a gasket and a slideable valve member. the valve member has a portion dimensioned to slideably engage the guide member of the beverage hopper.

17 Claims, 9 Drawing Sheets

DISPENSER VALVE ASSEMBLY

This application claims the benefit of U.S. Provisional Application No. 60/406,422, filed Aug. 28, 2002.

BACKGROUND

The present disclosure relates to an improved apparatus for producing a chilled or partially frozen beverage often referred to as a slush beverage. A variety of apparatus have been designed to produce chilled beverages as well as to produce beverages which are in slush form. Some of these apparatus are referred to as "granita" machines. Such apparatus can be used to produce slush beverages for a number of products including fruit juices, coffee-based beverages, tea-based beverages, dairy based beverages, as well as beverages containing alcohol. The apparatus include a chilling structure and some form of blade or auger which moves relative to the chilling portion to shave the frozen product off and circulate the beverage along the chilling portion. Circulation of the frozen beverage within the beverage hopper and along the chilling portion helps to reduce the temperature of the beverage mixture thereby causing the partially frozen beverage to approach a slush consistency.

Some prior frozen beverage apparatus have dispenser assemblies which included a large number of moving parts and an arrangement within assembly made more costly to assemble, and more time consuming to disassemble, clean, and reassemble for the end user or service personnel than was desirable. Improved ease of assembly and reassembly are desirable characteristics because many manufacturers recommend disassembly and cleaning of the dispenser at regular intervals.

Use of some prior dispensing apparatus can cause splattering of product during dispensing. Splattering most often occurs upon the initial operation or pull of the dispensing apparatus if the product flows too rapidly out of the dispenser or if gas that is trapped within the product escapes to the atmosphere. Splatter is undesirable because it may require cleaning surfaces of the machine. Further, the prior dispensers may operate in a manner which could cause some difficulty for an operator to gradually close the dispenser and could cause cup overflow and product waste.

In some situations, the chilled beverage product can form an "ice plug" at the terminal end of the dispenser nozzle channel from which the product is dispensed. Such "ice plugs" tend to thaw due to the slightly elevated temperature of the dispenser relative to the chilled beverage hopper. The formation of such a plug is undesirable since it can fall under its own weight at unexpected times causing it to splash within a drip tray which can require additional clearing by the operator.

Disclosed is an apparatus and method of dispensing a partially frozen beverage. The apparatus includes at least one beverage hopper for retaining a quantity of partially frozen beverage. The beverage hopper has a dispensing aperture formed therein and a guide member in an exterior surface of the beverage hopper. A chilling unit cools the partially frozen beverage retained within the beverage hopper. A dispenser assembly is provided which includes a handle, a biasing element, a gasket and a slideable valve member. the valve member has a portion dimensioned to slideably engage the guide member of the beverage hopper.

BRIEF DESCRIPTION OF THE DRAWINGS

The organization and manner of the structure and function of the invention, together with the further objects and advantages thereof, may be understood by reference to the following description taken in connection with the accompanying drawings, and in which.

DESCRIPTION

While the present disclosure may be susceptible to embodiment in different forms, there is shown in the drawings, and herein will be described in detail, an embodiment with the understanding that the present description is to be considered an exemplification of the principles of the disclosure and is not intended to limit the disclosure to the details of construction and the arrangements of components set forth in the following description or illustrated in the drawings.

Figure 1:
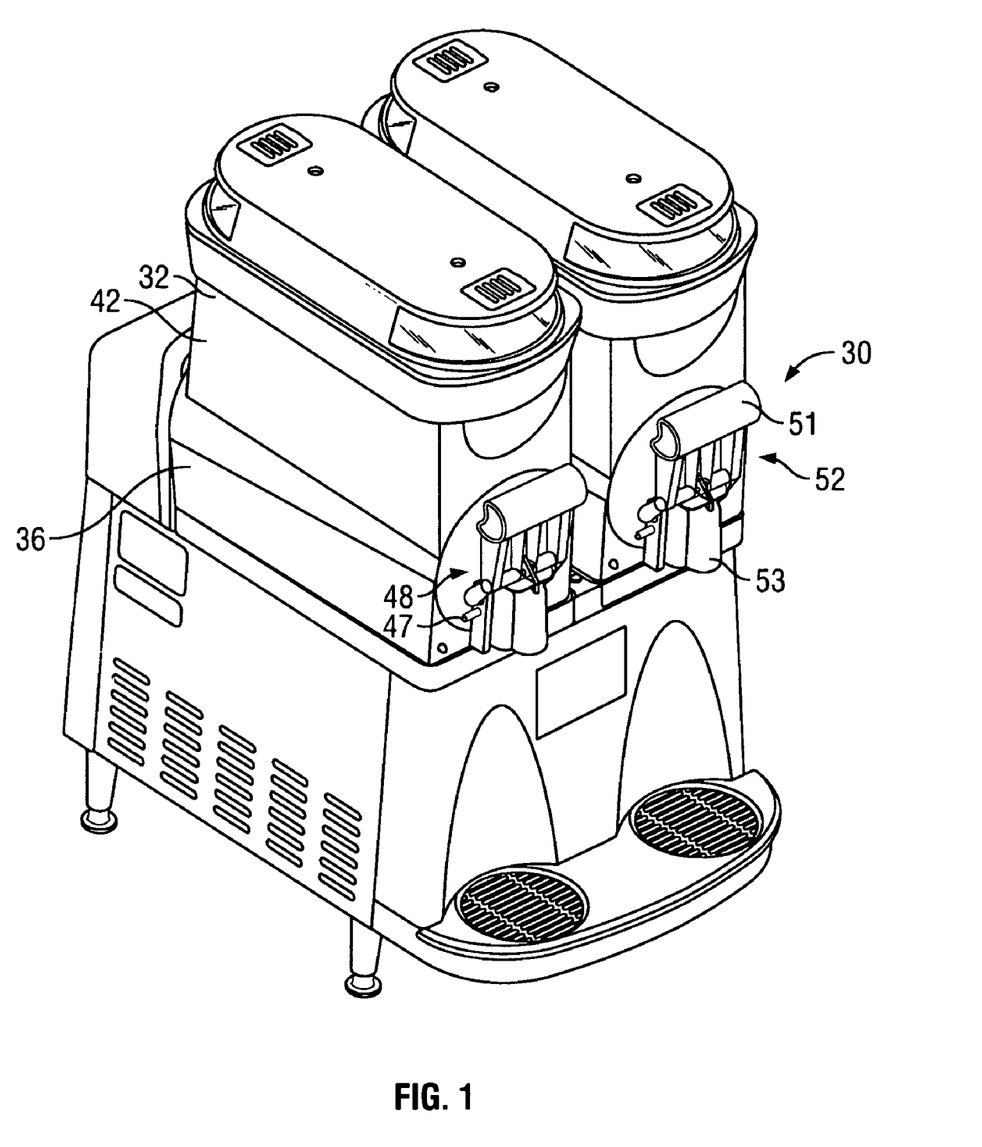
FIG. 1 is a top, front, left-hand perspective view of a beverage apparatus of the present disclosure.
Figure 7:
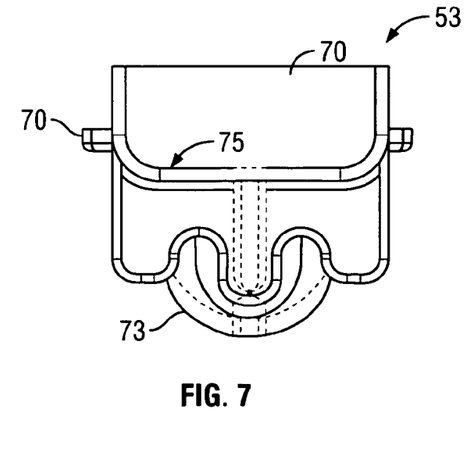
FIG. 7 is an enlarged top plan view of the valve member of FIG. 3.

With reference to the figures, a beverage apparatus 30 is shown in perspective in FIG. 1. The beverage apparatus 30 includes at least one hopper assembly 32 which is retained on a housing 34. As will be described in greater detail hereinbelow, the housing 34 includes a drive motor 36 (see FIG. 7) and a coolant system 200 (see FIG. 10). The drive motor 36 as mentioned above drives a rotatable mixing member which in the preferred embodiment shown in FIG. 7 is an auger assembly 38. Auger assembly 38 is positioned proximate to a chiller assembly 40, both being retained within a corresponding hopper assembly 32. It should be noted that while a two-hopper apparatus is shown in FIG. 1, it may be desirable to provide a single hopper as well as three or more hoppers. The term hopper as used herein means any enclosure for holding a chilled, frozen or partially frozen liquid beverage of a beverage dispensing system.

Briefly, the apparatus 30 is operated by placing a beverage solution in a selected hopper 42 of the hopper assembly 32, positioning a cover assembly 44 on top of the hopper 42 and activating the apparatus. Initial activation of the apparatus will result in rotation of the auger assembly 38 within the hopper and initiation of a new cooling cycle or "freeze down," as it is commonly known. Cooling is provided by the chiller assembly 40 which maintains the external surface 46 of the chiller assembly 40 at, or preferably below 32° F., during the "freeze down" period so that the warmed beverage is rapidly chilled to a partially frozen consistency (See FIGS. 18 and 19). As external surface 46 of the chiller assembly 44 begins to cool, the temperature of the beverage solution is decreased. The auger 38 revolves to mix the beverage solution within the hopper 42. The auger assembly 38 includes a helically configured blade which is positioned in close proximity to the external surface 46 of the chiller assembly 40 (See FIGS. 18 and 19). As the beverage solution is cooled, ice crystals form in the solution. The ice crystals generally form on or near the surface 46 of the chiller assembly 40, and the auger assembly 38 removes these crystals from the surface 46.

When the beverage product has reached the desired consistency, it is served by the operator by pulling downward of handle 51 of the dispenser assembly 52 thereby causing valve assembly 53 to slide downwardly along guide member 55 from a first, closed position in which gasket 56, mounted on the valve assembly 53, covers a hopper port 43 formed in the hopper 42 to a second open position. After filling the container 50 with frozen beverage product, the operator moves the handle upwardly from the second, open position back to the first, closed position causing the gasket 56 to cover and seal the hopper port 43.

Figure 2:
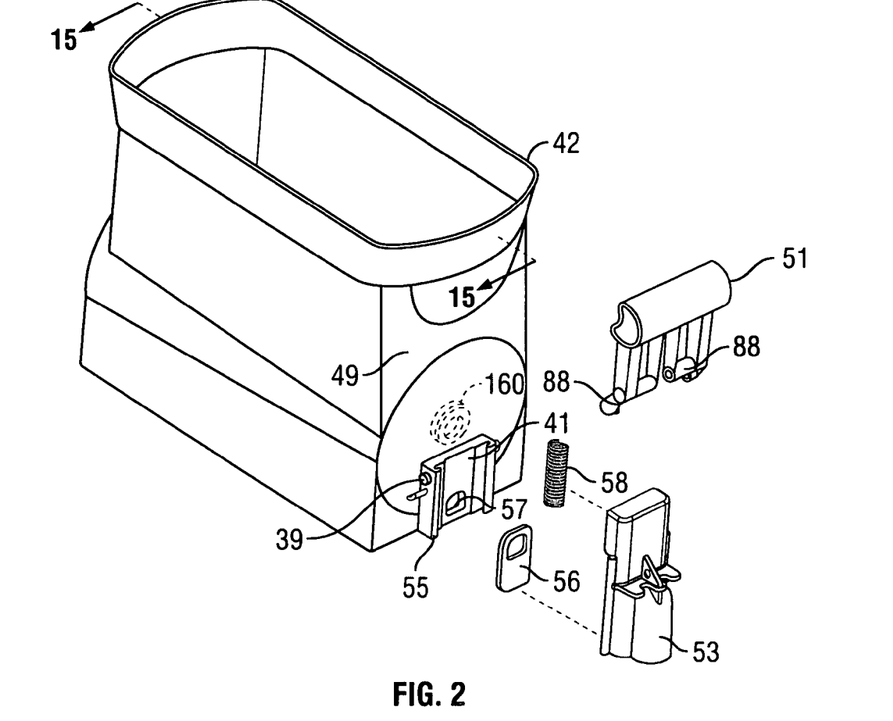
FIG. 2 is a front partially exploded view of the hopper and dispenser assembly taken from a left-handed perspective view of the apparatus of FIG. 1.
Figure 3:
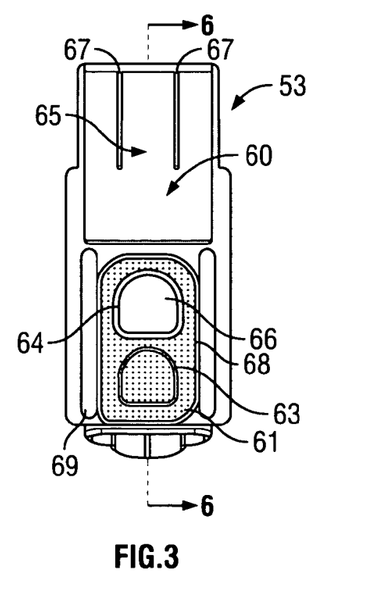
FIG. 3 is an enlarged back plan view of the valve member of FIG. 2.
Figure 4:
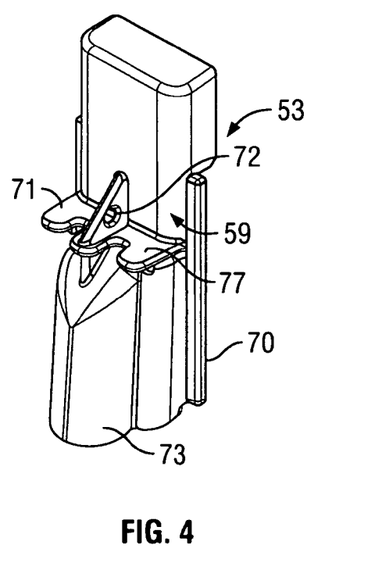
FIG. 4 is an enlarged front perspective view of the apparatus as shown in FIG. 3.
Figure 5:
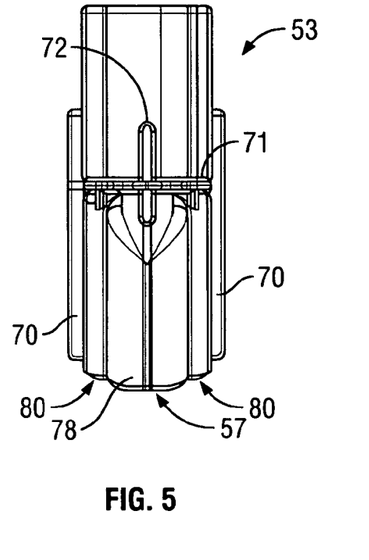
FIG. 5 is an enlarged front plan view of the valve member of FIG. 3.

Having now briefly described the general structure and operation of the present invention, we now turn to a more detailed discussion of the various structures of the apparatus. More particularly, FIG. 2 shows an exploded view of the dispenser assembly 48 including a handle 51, a valve member 53, a gasket 56 and a spring 58. Dispenser assembly 48 is assembled and mounted to hopper 42 as set forth in more detail herein below. As shown in FIGS. 3–5, valve member 53 has a front surface 59 and back surface 60. Back surface 60 defines a gasket recess 61 having dimples 62, ridge 63, valve aperture rim 64, and valve aperture 66. Valve aperture rim 64 defines the periphery of valve aperture 66 which is aligned with hopper port 43 during dispensing so that product may flow therethrough. Spring retaining flanges 67 are dimensioned and spaced apart to define a portion of a biasing member cavity 65 which receives a biasing member, such as a spring 58. Spring 58 biases the handle 51 upwardly when the operator is not dispensing product. The dimples 62 and ridge 63 extend sufficiently from back surface 60 to engage or compress the gasket 56 when it is mounted within the recess 61 to ensure sufficient force is available to form a reliable seal during operation of the dispenser assembly 48. Further, the design of the gasket 56 and dimples 62 allow for greater tolerances in the components of the dispenser assembly that are involved in forming a seal between the valve member 53 and the surface 41 located on the outer surface 49 of the hopper 42.

The ridge 64 and sidewalls 68 of recess 61 are dimensioned to snugly retain gasket 56 within recess 61. Preferably the sidewalls 68 and recess 61 are formed as an asymmetric structure, such as the "D" shaped member shown in FIG. 2, so that the gasket can be correctly installed in only a single orientation. The use of an asymmetric structure forces the assembler to place the appropriate side of the gasket toward the recess 61 during assembly.

Figure 6:
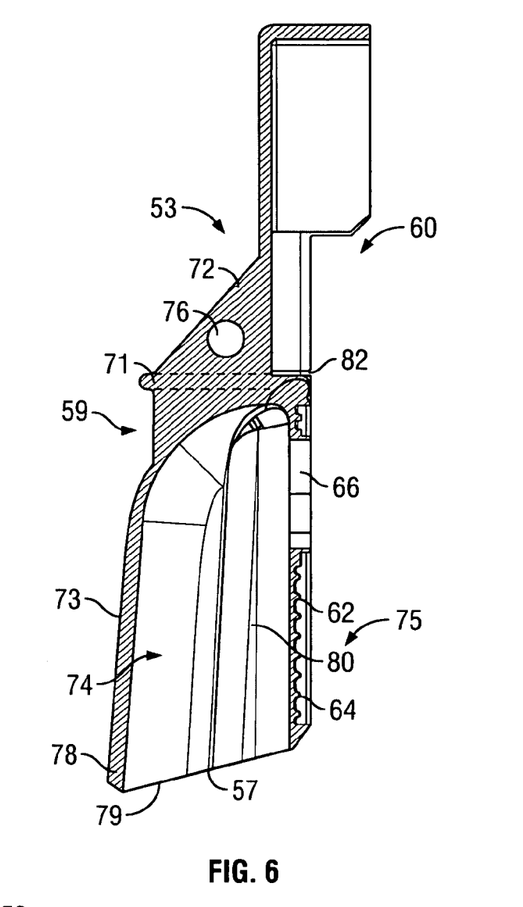
FIG. 6 is an enlarged cross-sectional view of the valve member taken along lines 6—6 of FIG. 3.
Figure 11:
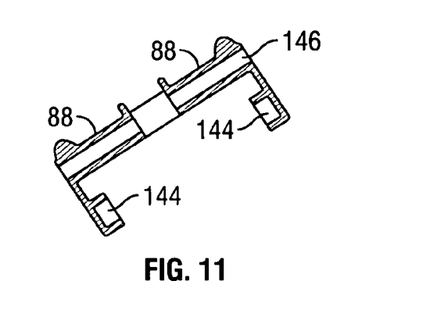
FIG. 11 is an enlarged cross-sectional view of the handle taken along lines 11—11 in FIG. 10.
Figure 12:
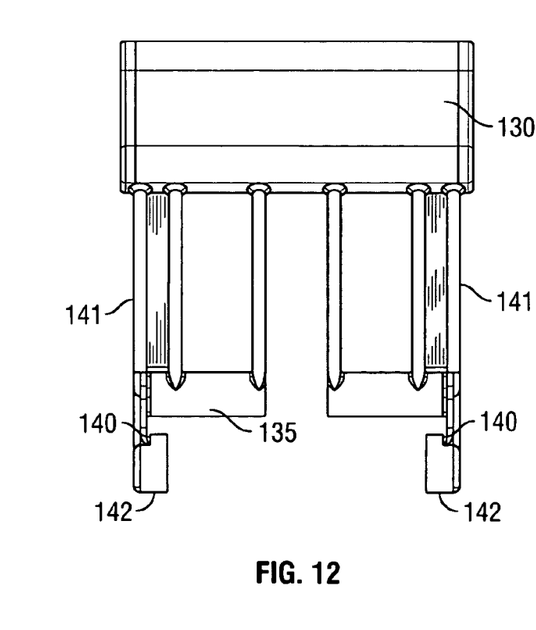
FIG. 12 is an enlarged plan view of the back side of the handle of FIG. 10.

As best seen in FIGS. 4–7, the front surface 59 of the valve member 53 includes elongated tongue members 70, a flange 71, a rib 72, and a front 73 wall portion defining a dispensing channel 74 as best seen in FIG. 6. The dispensing channel 74 is defined by front wall 73 and back wall 75 of the valve member 53. The rib 72 defines a locking aperature 76 for receiving a locking device (not shown) that prevents operation of the machine after business hours by unauthorized personnel. The flange 71 includes a drive surface 77 on its upper portion which is contacted by a camming surface 88 on the handle 51 (See FIGS. 10–12) to drive the valve member 53 from the first, closed position to second, open position. As best seen in FIGS. 3 and 4, the tongue members 70 are located along the periphery of the valve member 53 and are arranged and dimensioned to be slidably received within guide members 55 to move the valve member 53 from the open to closed position.

Turning to FIG. 6, the valve member 53 has an interior dispensing channel 74 which defines a flow path for the frozen beverage that extends from the valve aperture 66 to the dispensing aperture 57 and includes central chamber 79 and side vents 80. Central chamber 79 preferably has a cross-sectional area exceeding the cross-sectional area of the smaller of the valve aperture 66 or hopper port 43. This dimensioning helps ensure that the beverage will not become lodged in the dispensing channel 74 after the valve member 53 is moved from an open to closed position. Because the dispensing chamber 74 has a larger cross-section than the smaller of the valve aperture 66 or hopper port 43, the weight of the beverage contained within the channel 53 contributes to its generally continuous exit from the channel rather than becoming lodged therein and later melting and dripping or falling into the drip pan. Preferably, the ratio of the cross section of the channel 74 should be at least about 1.2 times greater, and preferably about 1.5 times greater, than the cross section of the smaller of the hopper port 43 and valve aperture 66. Although it is to be understood that it is preferable for the hopper aperture 43 and valve aperture 66 to be closely matched in size to facilitate the formation of a reliable seal.

The dispensing channel 74 also has at least one side vent, preferably a pair of side vents 80 as best seen in FIGS. 5 and 6. Side vents 80 preferably extend between the dispensing aperture 57 and the top portion of the channel 74 past the valve aperture 66 to define top portion of the channel known as a crown gap 82. The vents 80 do not completely fill with beverage during dispensing and therefore provide a passageway or flow path for air or gases trapped within the beverage. The provision of an air flow path has several benefits. First, the side vents helps prevent the formation of a vacuum within the dispensing channel 74 as the beverage flows therethrough. Some prior designs lacking such air vents were prone to the development of a vacuum within the dispensing channel 74 which can contribute to retention of beverage within the channel after completion of a dispensing operation. This process is commonly known as an "ice plug" formation. Second, the side vents 80 provide an escape path for air or other gases trapped within the beverage. The escape of those gases within the channel can contribute to a substantial reduction in splattering of the beverage during filling of a container.

Further, as best seen in FIG. 6, the downward curving profile of the upper portion of the dispensing channel also helps prevent splattering upon the initial opening of the valve member 53 as any pressurized product will splatter against the upper portion of the channel and be directed along the curve and directed downwardly along the elongated channel. Prior designs may have had the dispensing port arranged close to the dispensing aperture which could cause pressurized beverage from within the chamber to expand as it was delivered to the dispensing aperture. Further, the bottom, front portion of the wall 73 extends further downward than the back portion to form a hood 78 to further shield the operator from drips and splatters.

Figure 8:
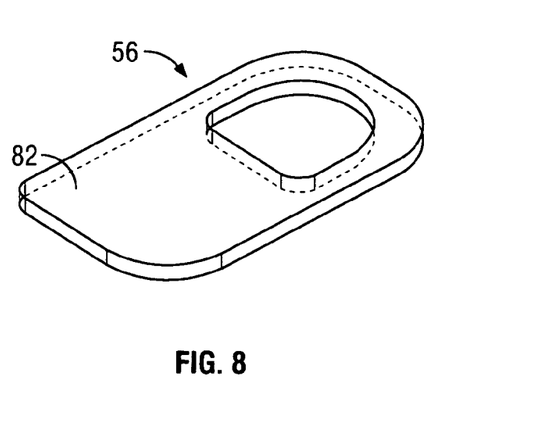
FIG. 8 is an enlarged perspective view of a gasket shown in FIG. 2.
Figure 9:
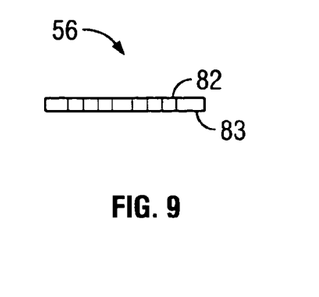
FIG. 9 is a side elevational view of the gasket of FIG. 2.

Turning now to FIG. 8, which shows a perspective view of the gasket 56. The gasket 56 is dimensioned and arranged to be received and retained within recess 61 of valve member 53. Gasket 56 has a resilient surface 82 and a lubricious surface 83. The resilient surface 82 provides the required sealing force when the sealing member 56 is compressed between sealing surface 41 of the hopper 42 and the valve member 53. The lubricious surface 83 allows for smooth movement of the gasket 56 along the surface of the hopper 42 as the valve member 53 is slid during opening and closing. In the illustrated embodiment, gasket 56 is formed by bonding of a thin sheet of acid treated polytetrafluoroethythelyne or PTFE (lubricious surface) to a thicker sheet of silicone (resilient surface). The two layers chemically bond together to form a single sheet with a lubricious surface and resilient surface having the properties described above. Although PTFE and silicon are preferred, it is contemplated that other suitable materials may be substituted.

The bonded PTFE/silicon sheet is preferably die cut into an asymmetrical shape such as the "D" shaped structure shown in FIG. 8. The straight wall 84 of the "D" shaped sealing member renders it asymmetrical so that it may only be installed with the lubricious surface 72 facing outwardly. This prevents the operator from reassembling the dispenser with the gasket 56 facing the wrong way which could hinder efficient operation of the apparatus.

As shown in FIG. 2, the biasing member is preferably a coiled spring 58, but may also include a leaf spring, disk spring, gas filled resilient container, deformable resilient pad, or other resilient structure. Coiled spring 58 is slightly compressed and then inserted within spring cavity 65 and is retained therein between spring retaining flanges 67. When installed, a portion of spring 58 extends beyond the spring cavity 65 and is brought into contact with a ledge 45 extending from the exterior surface 49 of housing 42. This causes the spring to further compress as the valve member is slid further along its path during opening.

Figure 10:
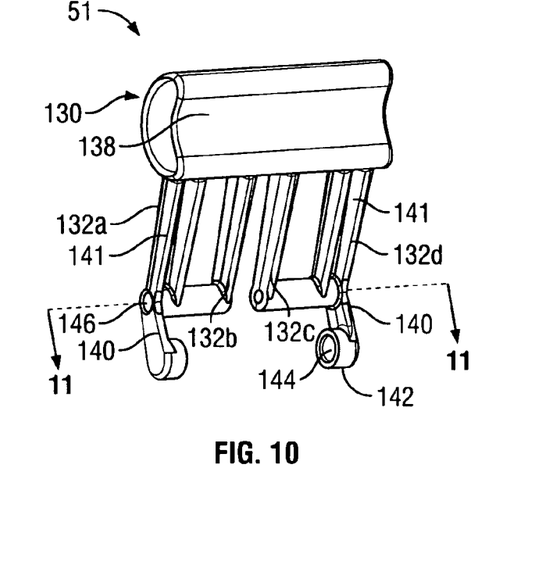
FIG. 10 is an enlarged perspective view of the handle as shown in FIGS. 1 and 2.

Turning to FIG. 10, a handle 51 is shown having a gripping portion 130, arms 132, drive member 134, and mounting cups 142. Gripping portion 130 includes a concave surface 138 for accommodating the operator's fingertips. The arms 132 a–d extend downwardly from the handle and drive member 134 extends between each pair of arms, 132 a, b and 132 c, d, respectively. Drive member 134 has a concave outer surface 135 that is dimensioned to contact drive surface 77 of flange 71 on the valve member 53. This lower portion 140 of exterior arms 132a and 132d extend at an angle to arm upper portions 141 and their terminal portions define inwardly facing cup members 142 defining a pair of orifices 144 which are dimensioned to insert onto posts 39 formed on the exterior surface 49 of hopper 42.

Handle 51 is preferably made by injection molding a suitable plastic resin having sufficient flexibility and resiliency to allow the lower portion 140 of arms 132a and 132d to flex outwardly and snap back inwardly to mount cup members 142 on posts 39. The walls of the drive member 134 defines an interior passageway 146 which is dimensioned to receive a rod of a locking assembly (not shown) to inhibit the movement of the handle and thereby prevent operation by unauthorized personnel after normal business hours. Interior passageway 146 is arranged to line up with locking aperture 72 of valve member 53 so that both structures may receive the rod of the locking assembly. Although the embodiment shown in FIGS. 1–15 show a dispenser assembly having a separate, rotatable handle 51, it is contemplated the a handle structure could be molded directly into the exterior surface of the valve member which could be actuated by pressing downward on the handle to travel along a generally linear path. The illustrated configuration with a separate, rotatable handle is preferred because it provide additional force and smoother movement against the biasing force of spring 58.

Figure 13:
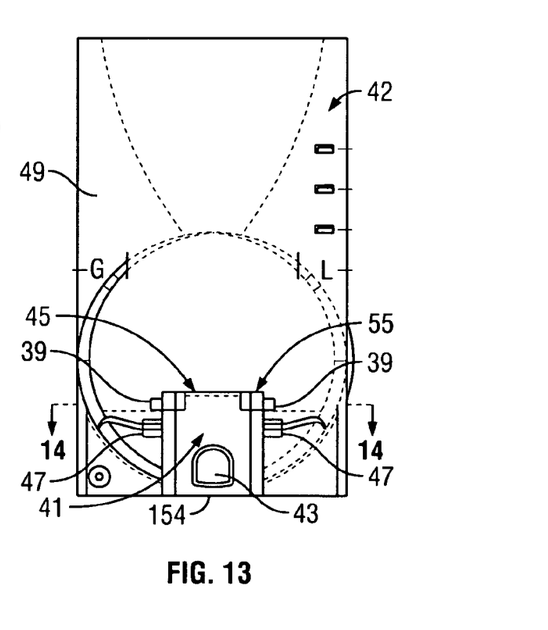
FIG. 13 is a front plan view of the hopper shown in FIGS. 1 and 2.
Figure 14:
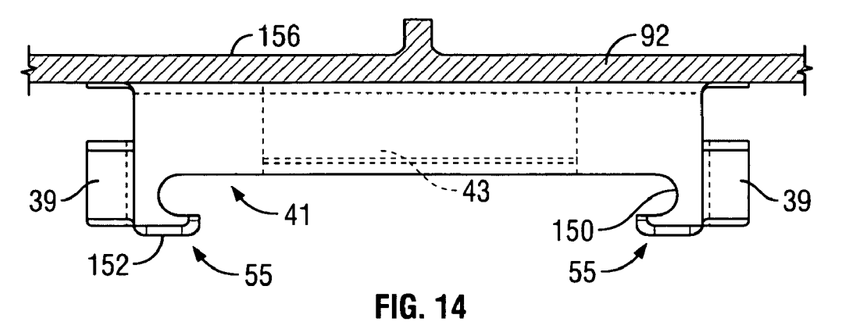
FIG. 14 is an enlarged partial fragmentary, cross-sectional view of a guide member taken along lines 14—14 in FIG. 15.
Figure 15:
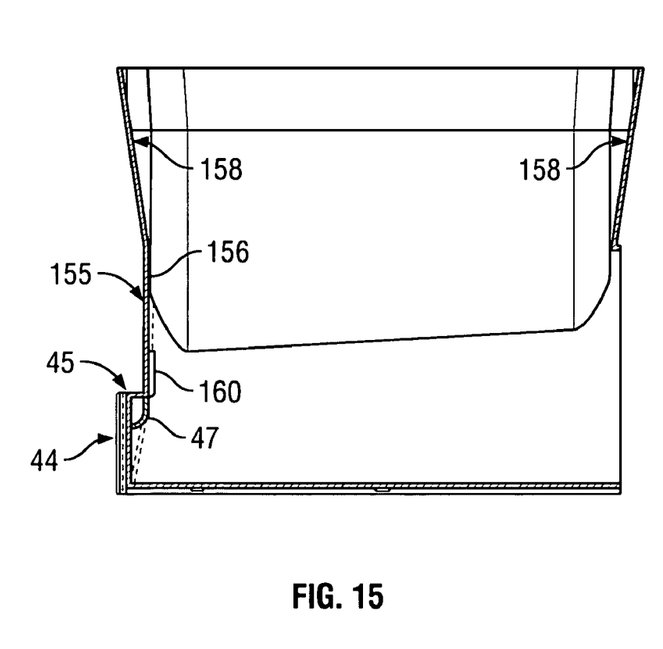
FIG. 15 is a side elevational view of the hopper taken along line 15—15 in FIG. 2.

Turning now to FIGS. 13–15, the exterior surface 49 of the hopper 42 includes posts 39, sealing surface 41, hopper port 43, ledge 45 and stop members 47. A pair of posts 39 extend outwardly from the peripheral edge of the guide members 55 and are located above the stop members 47 which also extend from the periphery of the guide members 55. The posts 39 are dimensioned and arranged to receive cup members 142 of handle 51 in order to mount handle on hopper 42. The stop members 47 preferably are a pair of upwardly curved projections which engage a portion of the drive member 134 to prevent over rotation of the handle to open the hopper port 43 in order to dispense beverage.

As best seen in FIG. 14, guide members 55 are preferably a pair of spaced grooves 150 defined by curved wings 152 extending from the periphery of sealing surface 41. It is contemplated that guide members 55 might alternatively be slots or channels formed at the periphery of the sealing surface which would necessitate a complementary structure formed on valve member 53 such as a guide pin or post for sliding travel within such alternate guide member.

Sealing surface 41 is preferably planar and smooth to facilitate the sliding of the lubricious surface 83 of gasket 56 during opening and closing of the hopper port 43. Hopper port 43 is preferably placed near the bottom of the hopper 42 to assist in complete drainage of product from the hopper during product emptying for cleaning or service. Hopper port 43 has a flattened lower edge 154 which approximates the curvature of the bottom portion of the hopper 42 to facilitate complete drainage of the hopper 42. As best seen in FIGS. 14 and 15, hopper sealing surface 41 preferably projects forward from the mid-portion 155 of front wall 156 of the hopper 142. This arrangement provides room for the handle 51 to pivot, with cup members 142 rotating on posts 39, from the closed position in which the concave surface 138 of the handle 51 rests near the mid portion 155 to the fully opened position in which drive member 134 contacts stop members 47.

As seen in FIGS. 2 and 15, the interior surface 158 of hopper 42 includes a nose bushing 160 which is designed to receive the nose portion 120 of auger assembly 90. The integral molding of the nose bushing 160 into the hopper 42 avoids the necessity of fabricating a separate bushing and eases positioning of the auger assembly within the hopper during assembly.

The relatively simple design of the embodiments of dispenser assemblies disclosed herein significantly simplifies assembly and disassembly of the dispenser during cleaning or initial assembly of the beverage apparatus 30. To assemble the dispenser assembly 48, spring 58 is slightly compressed and inserted into the spring cavity 65 formed by the back surface 60 of the valve member 53. Gasket 56 is inserted into seal recess 61 in valve member 53. Then, tongue members 70 on valve member 53 are inserted into grooves 150 of hopper 42 and slid downwardly until spring 58 contacts ledge 45. Next, one of the cup members 142 on handle 51 is inserted onto post 39 of hopper 42. The second arm, either 132a or 132d, is stretched outwardly so that second cup member 142 snaps onto the second post 39. Disassembly of the dispenser assembly 48 is substantially the opposite procedure. One of the handle arms, either 132a or 132d, is stretched to remove a first cup 142 from a first post 39. The second cup 142 is then removed from the second post 39. Valve member 53 is then slid upwardly until tongues 70 are removed from grooves 150. Then, spring 58 can be removed from spring cavity 65 and gasket 56 can be removed from sealing recess 61 of valve member 53.

To operate the dispensing assembly 48, the operator pulls downward on handle 51 which causes handle 51 to rotate outwardly and downwardly about posts 39. This causes drive surface 88 on the handle 51 to contact drive surface 77 on flange 71 of the valve member 53. This, is turn, causes tongue members 70 on the periphery of the valve member 53 to slide within grooves 150 to move the valve member 53 from a first closed, position in which gasket 56, mounted on the valve assembly 53, covers hopper port 43 formed in the hopper 42 to a second, open position. In the second, open position, the hopper port is aligned with valve aperture 66 which allows the beverage product to flow within dispensing channel 74 to the dispensing aperture 57. Generally, side vents 80 do not fill with beverage product so that an air passageway generally is maintained between the valve aperture and dispensing aperture. In the first, open position, the spring 58 is compressed between a portion of the spring cavity 65 of the valve member 53 and the ledge 45 on the exterior surface 49 of the hopper 42. After dispensing with beverage product, the operator moves the handle upwardly from the second, open position back to the first, closed position. This allows the upward biasing force of the compressed spring 58 to cause valve member 53 to travel upwardly until the gasket 56 covers and again seals the hopper port 43.

It has been found that the sliding engagement of the substantially planar gasket 56 with the planar sealing surface 41 in combination with selection of an appropriate biasing member having a reasonable biasing force provides a smoother action than prior dispenser arrangements. This smoother operation can also contribute to reduction of splattering of product during operation because the operator is forced to make smooth steady movements during dispensing rather than abrupt ones. Moreover, in some prior designs, if the operator were to let go of the handle too fast, it tended to jerk upwardly which can lead to product splattering.

Figure 16:
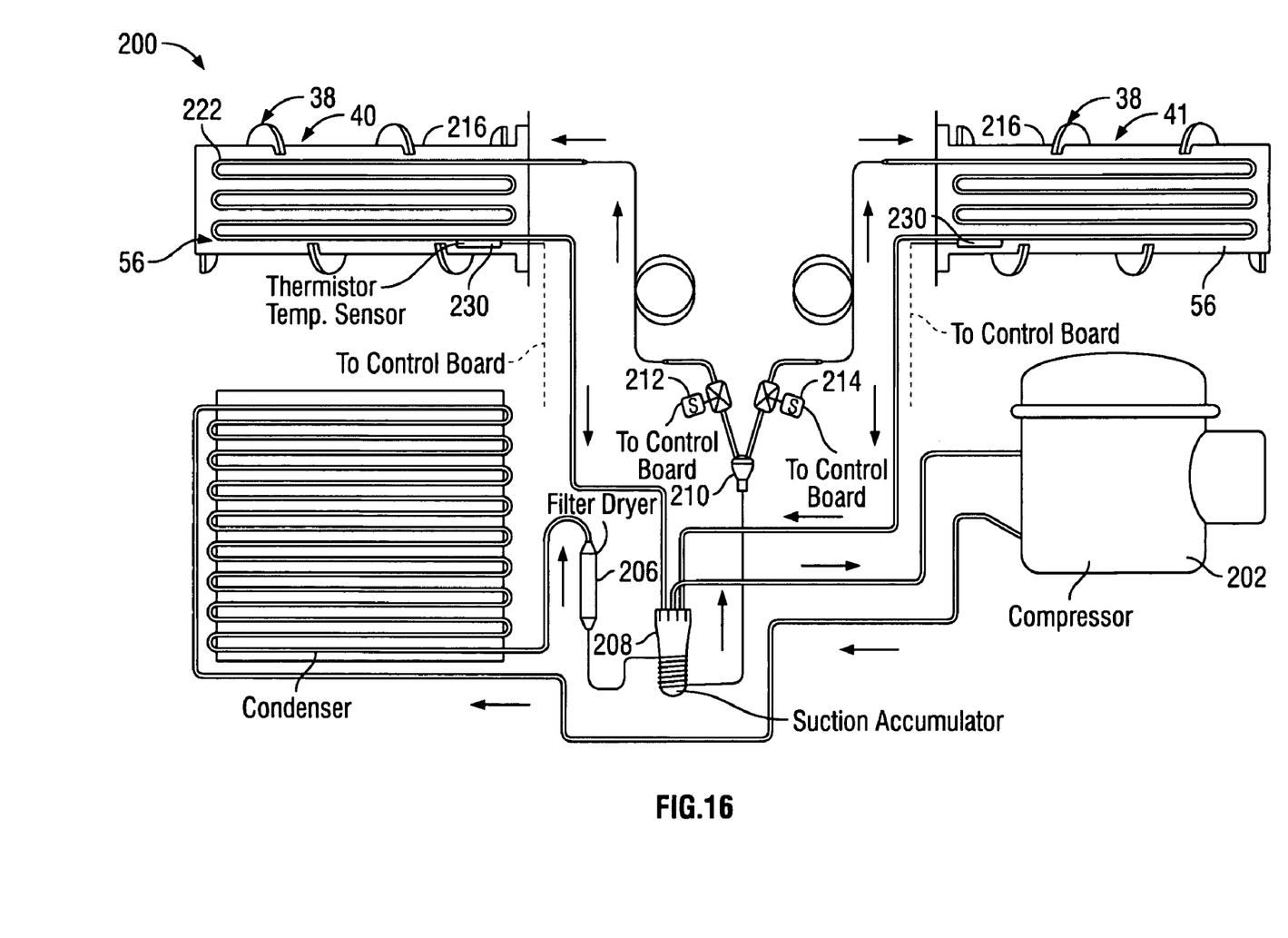
FIG. 16 is a diagrammatic illustration of the cooling system of the disclosure.

Turning now to FIG. 16, the coolant system 200 of the present disclosure is shown diagrammatically therein. The coolant system 200 includes a compressor 202, a condenser 204, a filter dryer 206 and a suction accumulator 208. The coolant system provides coolant distribution to a pair of chiller assemblies 40. Coolant is distributed to one or both of the chiller assemblies 40 depending upon whether chilling is needed in one or both hopper 42. Selective control of coolant to the chiller assemblies 40 is achieved by using a splitter 210 and a pair of controllable solenoid valves 212, 214.

Figure 19:
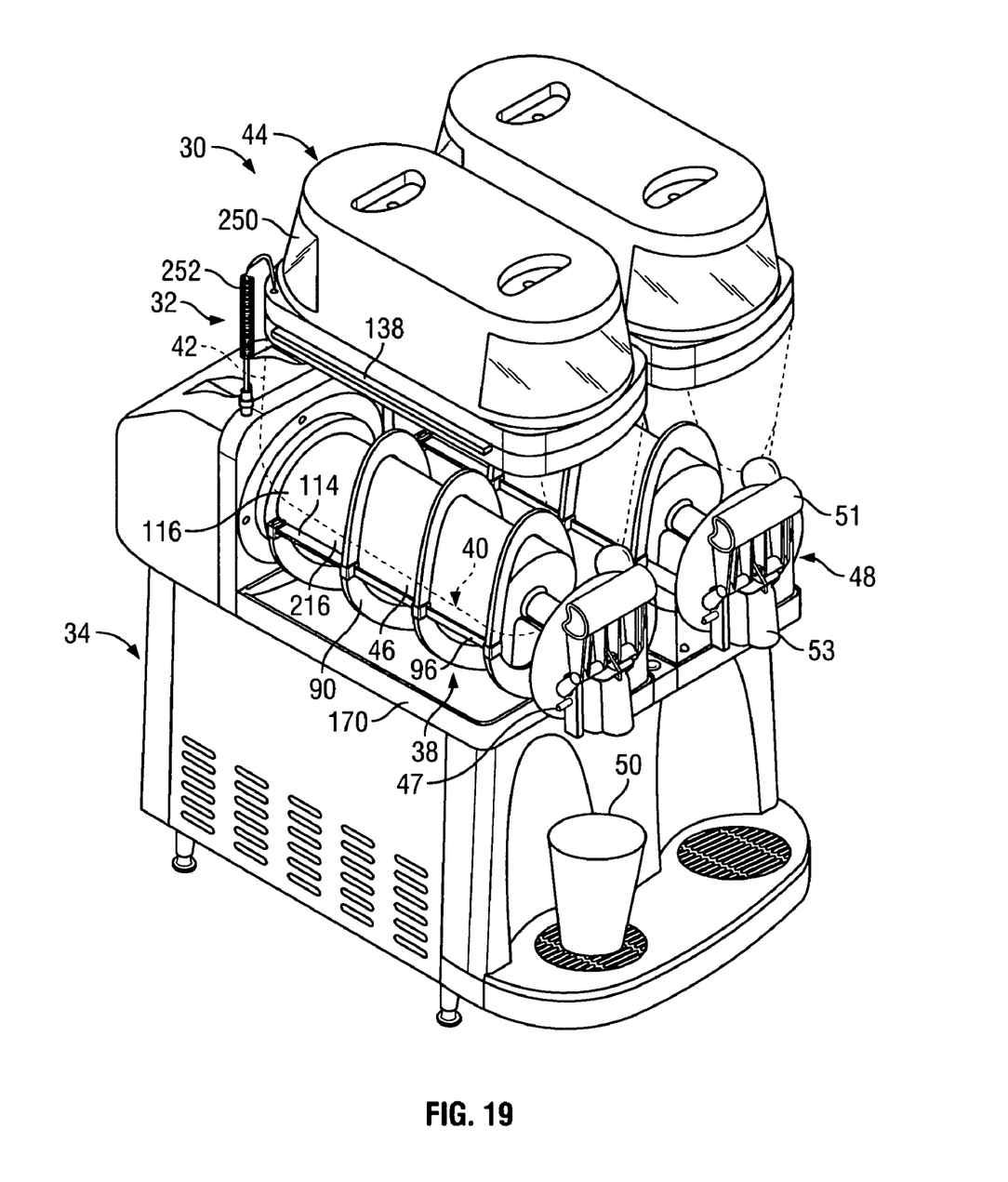
FIG. 19 is a perspective view of the average apparatus of the present disclosure.

As indicated in FIG. 19, the auger assembly 38 moves relative to the fixed drum 216 so as to spread and move beverage mixture along the outside surface 46 thereby transferring heat from the beverage mixture to the coolant flowing through coil 222. A thermistor temperature sensor 230 is provided internally of the chiller assembly 40 and is connected to a control circuit.

Figure 17:
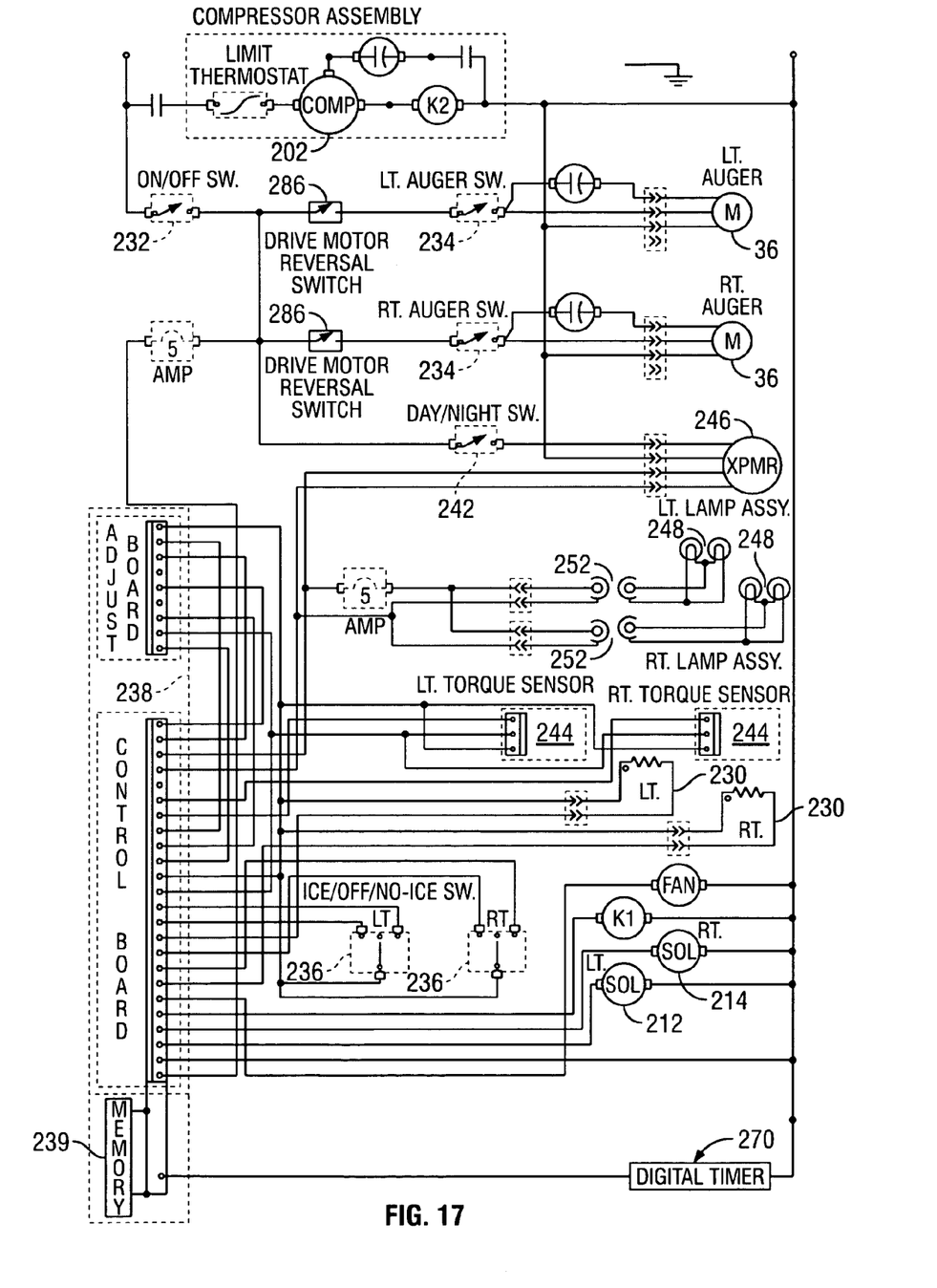
FIG. 17 is a schematic of the system of the present disclosure.

Turning now to the electrical schematic as shown in FIG. 17, the present system includes generally redundant left and right assemblies. As such, reference to each assembly will be made by using identical reference numerals where possible. Further, reference numerals indicated hereinabove will generally be used to indicate the same elements illustrated diagrammatically in the schematic of FIG. 17.

With reference to FIG. 17, the system includes a main power switch 232 which controls power to the overall system. Additionally, each hopper and chiller assembly has a separate auger switch 234 which controls the power to the corresponding motor 236. Control of the chilling of beverage is achieved by use of the ice/no-ice switches 236 which are coupled to a control circuit or controller 238. The controller 238 also has a digital timer 270 which records the elapsed time for the current operations performed by a number of components of the apparatus 30 and stores that information including the mode of operation and length of the time period in controller memory 239. The components for which the timing of operations are recorded and stored preferably include ice/no ice switches 236, thermistor 230, torque sensor 244, and drive motor 36.

The action of solenoid valves 212, 214 is also controlled by controller 238. In the "ice" position of valve 236, the valves are controlled in response to the torque measurement from sensor 244. In the "no-ice" position, the valves are controlled in response to the temperature sensed by thermistor 230 as compared to a desired value (typically 37° F.) stored in the controller 239 memory. Variable resistors 240 allow the user to set the torque which yields the desired slush stiffness when 236 is in the "ice" position. The compressor is switched on or off by the controller 238 in a way which maximizes its life by reducing wear and tear. Controller memory 239 also stores the amount of time elapsed when one or more of the solenoid valves 212, 214 is maintained in the "ice" position.

Figure 18:
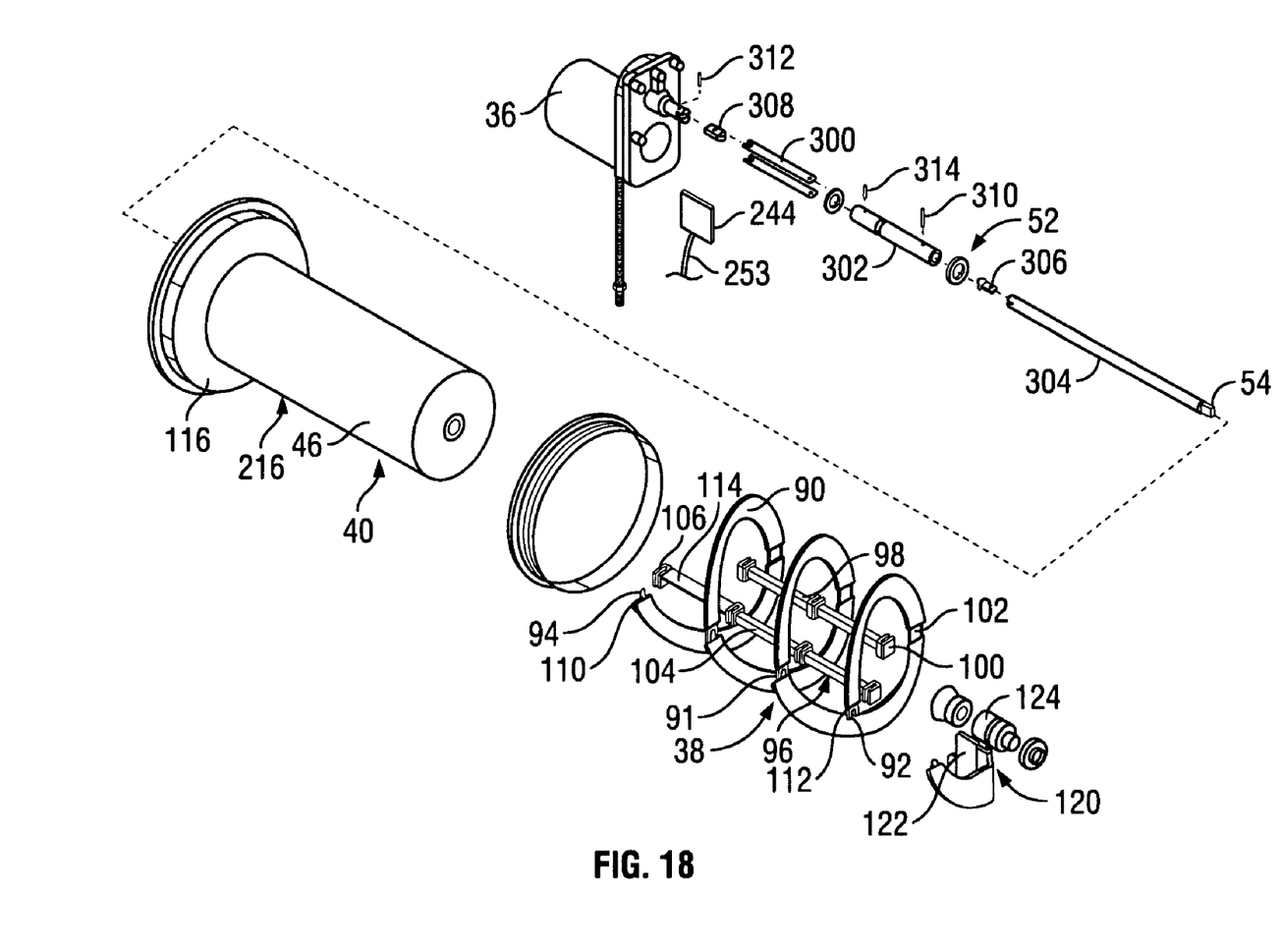
FIG. 18 is an exploded perspective view of a drive assembly, auger assembly and chiller assembly.

Turning now in more detail to the auger assembly 38 as shown in FIGS. 18 and 19, which is driven by the motor 36 and the motor shaft assembly 52, the auger assembly 38 as shown includes three auger sections 90. As shown in FIG. 18, the motor shaft assembly 52 comprises a pair of torsion springs 300 positioned within a torsion spring retainer 302. The torsion springs 300 is retained on a mixing shaft, moving shaft or auger shaft 304. The ends of the torsion springs 300 are positioned in torsion spring bearings 306, 308, respectively retained on the auger shaft 304. The assembly 52 is retained by use of a first pin 310 extending through the retainer 302, auger shaft 304, bearings 306 and torsion springs 300. A second pin 312 extends through a slot in the retainer 302 in the torsion springs 300. A reference pin 314 is provided on the retainer 302 so that the relative angular movement of the pins 312, 314 can be sensed by a torque sensor 244 positioned in close proximity thereto. As can be seen in FIG. 18, three identical auger sections 90 are connected by interlocking structures 91 on opposite ends thereof. An interlocking recess 92 is provided on one end of the auger section 90 while an interlocking protrusion 94 is provided on the opposite end of the auger section 90. By connecting the interlocking portions 92, 94, the auger sections 90 can be coupled to create the larger continuous helical blade of the auger assembly 38.

These auger sections 90 are retained in engagement by auger latch bars 96, 98 which have clips 100 for engagement with necked areas 102 on the auger sections 90. The clips are attached to and spaced apart by cross members 104. The clips 100 are configured with a reduced dimension mouth 106 to provide snap-fit engagement over the necked areas 102. The necked areas 102 are also provided in the area where the interlocking structures 92, 92, 94 are mated. As such, the clips 100 also assure that the interlocking structures 91 will not become disengaged during rotation of the auger. The cross members 104 also provide desired spacing between the sections 90 to prevent shifting of the auger sections 90 during rotation. It should be noted that the auger latch bar 96 includes four clips which attach to a first 110 and a second 112 terminal end of the three attached auger sections 90. A cross member 114 positioned near the first terminal end is oriented generally perpendicular to the other cross members 104. The perpendicular cross member 114 provides a driving action on the beverage solution positioned towards the base 116 of the chiller assembly 40.

The second terminal end 112 positioned towards the front of the apparatus includes an auger nose 120 attached thereto. The auger nose 120 includes a sweeping blade 122. A cap end 124 of the auger nose 120 attaches to the distal end 54 of the motor shaft assembly 52. As such, connection of the cap end 124 to the motor shaft assembly 52 results in rotation of the auger assembly 38. Generally, driving forces are transferred from the motor shaft 52 to the auger nose 120. The series of auger sections 90 attached to the auger nose 120 are pulled or rotated around the outside 46 of the chiller assembly 40. In the forward rotation direction (counter clockwise) this driving and sweeping action pull the beverage mixture from the rear of the hopper towards the front of the hopper. In the reverse rotation direction (clockwise), the driving and sweeping action pulls the beverage mixture from the top of the front end 43 toward the bottom of the back end 45 of the hopper 42.

While an embodiment has been illustrated and described in the drawings and foregoing description, such illustrations and descriptions are considered to be exemplary and not restrictive in character, it being understood that only an illustrative embodiment has been shown and described and that all changes and modifications that come within the spirit of the invention are desired to be protected. The applicant has provided description and figures which are intended as an illustration of certain embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods that incorporate one or more of the features of the disclosure and fall within the spirit and scope of the present disclosure as defined by the appended claims.

What is claimed is:

1. An apparatus for containing and dispensing a beverage comprising:
   at least one beverage hopper for retaining a quantity of beverage;
   a portion of the beverage hopper defining a port;
   a guide carried on the beverage hopper;
   a dispenser assembly including a handle, a biasing element, a gasket and a slideable valve;
   the valve having a portion dimensioned to be moveably retained on the guide of the beverage hopper;
   the valve defining a channel therethrough;
   the biasing element being retained relative to the valve for biasing the valve to a position to prevent dispensing of beverage;
   the gasket being carried on the valve and having a portion for sealing around the port during dispensing and a portion for sealing over the port when not dispensing;
   posts on the hopper for engagement with the handle;
   the handle movably retained on the posts being operable against the slideable valve for generally linearly displacing the valve along the guide on the hopper;
   movement of handle from a first position against the biasing element displacing the channel in the valve relative to the hopper for aligning the channel with the port to dispense beverage from the hopper;
   movement of the handle to a second position generally by the biasing element displacing the valve for aligning the gasket carried on the valve to cover the port to prevent dispensing beverage.

2. The apparatus of claim 1 wherein the gasket is a resilient body having a first surface with a planar sealing surface and an elongated portion defining an opening for dispensing beverage.

3. The apparatus of claim 2 wherein the first surface of the gasket includes a lubricious material for facilitating sliding of the gasket along the exterior surface of the beverage hopper adjacent to the port.

4. The apparatus of claim 3 wherein the lubricious surface is coated with a material including polytetrafluorethylelene.

5. The apparatus of claim 1 wherein the beverage hopper has a generally planar sealing surface located adjacent to the port.

6. The apparatus of claim 1 wherein the slideable valve has a front wall and a back wall which define the dispensing channel, the front wall and back wall being dimensioned to define at least one side vent in the dispensing channel.

7. The apparatus of claim 1 wherein the channel includes a valve aperture for alignment with the hopper port and a dispensing aperture distal the valve aperture a cross sectional areas area of the dispensing channel proximate to the valve aperture is less than the cross sectional area of the dispensing channel proximate to the dispensing aperture.

8. The apparatus of claim 7 wherein the ratio of the cross sectional area of the dispensing channel to the cross sectional area of the dispensing aperture is greater than about 1.2 to 1.

9. The apparatus of claim 7 wherein the ratio of the cross sectional area of the dispensing channel to the cross sectional area of the dispensing aperture is greater than about 1.5 to 1.

10. A dispenser assembly for use with an apparatus for containing and dispensing a beverage having at least one beverage hopper for retaining a quantity of beverage, a guide positioned on the beverage hopper, a port being defined on a hopper proximate to a guide, the dispenser assembly comprising:
   a handle, a biasing element, a gasket and a slideable valve having a portion dimensioned to moveably engage the guide of the beverage hopper;
   the handle being movably coupled to the hopper for controllably acting against the valve for linearly displacing the valve relative to the port for aligning the valve with the port in a first position to dispense beverage from the hopper and for aligning the valve in a second position to cover the port to prevent dispensing beverage;

the biasing element being retained relative to the valve for biasing the valve to the second position covering the port; and the gasket being carried on the valve and having a portion for sealing around the port in the first position and a portion for sealing over the port in the second position.

11. The dispenser assembly of claim 10 wherein the gasket is a resilient body having a first surface with a planar sealing surface and an elongated portion defining an opening for dispensing beverage.

12. The dispenser assembly of claim 11 wherein the first surface of the gasket includes a lubricious material for facilitating sliding of the gasket along the exterior surface of a beverage hopper adjacent a port.

13. The dispenser assembly of claim 12 wherein the lubricious surface is coated with a material including polytetrafluorethylelene.

14. The dispenser assembly of claim 10 wherein the slideable valve has a front wall and a back wall which define the dispensing channel, the front wall and back wall being dimensioned to define at least one side vent in the dispensing channel.

15. The dispenser assembly of claim 10 wherein the channel includes a valve aperture for alignment with the hopper port and a dispensing aperture distal the valve aperture, a cross sectional area of the dispensing channel proximate to the valve aperture is less than the cross sectional area of the dispensing channel proximate to the dispensing aperture.

16. The dispenser assembly of claim 15 wherein the ratio of the cross sectional area of the dispensing channel to the cross sectional area of the dispensing aperture is greater than about 1.2 to 1.

17. The dispenser assembly of claim 15 wherein the ratio of the cross sectional area of the dispensing channel to the cross sectional area of the dispensing aperture is greater than about 1.5 to 1.

* * * * *

UNITED STATES PATENT AND TRADEMARK OFFICE
CERTIFICATE OF CORRECTION

PATENT NO.         : 7,152,765 B1                                          Page 1 of 1
APPLICATION NO. : 10/651274
DATED              : December 26, 2006
INVENTOR(S)        : Midden et al.

It is certified that error appears in the above-identified patent and that said Letters Patent is hereby corrected as shown below:

In Column 2, line 36, "15" should read --13--;

In Column 2, line 64, "FIG. 7" should read --FIG. 18-- and "FIG 10" should read --FIG 16--;

In Column 2, line 67, "7" should read --19--;

In Column 3, line 45, "48" should read --52--;

In Column 3, line 47, "48" should read --52--; and

In Column 3, line 63, "48" should read --52--.

Signed and Sealed this

Third Day of February, 2009

JOHN DOLL
*Acting Director of the United States Patent and Trademark Office*